United States Patent [19]
Bergstrom et al.

[11] 4,249,076
[45] Feb. 3, 1981

[54] OPTICAL MEASURING DEVICE USING OPTICAL FIBERS

[75] Inventors: Jan Bergstrom; Hans Bertilson, both of Lund; Torgny Brogardh; Anders Persson, both of Vasteras, all of Sweden

[73] Assignee: ASEA Aktiebolag, Vasteras, Sweden

[21] Appl. No.: 961,847

[22] Filed: Nov. 17, 1978

[30] Foreign Application Priority Data

Nov. 23, 1977 [SE] Sweden .............................. 7713207
May 30, 1978 [SE] Sweden .............................. 7806189

[51] Int. Cl.³ .............................................. G01D 5/34
[52] U.S. Cl. .................................. 250/227; 250/231 R
[58] Field of Search ................... 250/227, 231 R, 551, 250/205

[56] References Cited

U.S. PATENT DOCUMENTS 3,335,367  8/1967  Skooglund et al. ............. 250/227 X
4,152,075  5/1979  Rellstab et al. ................. 250/227 X Primary Examiner—David C. Nelms
Assistant Examiner—Darwin R. Hostetter
Attorney, Agent, or Firm—Watson, Cole, Grindle & Watson

[57] ABSTRACT

In an optical measuring device for measuring physical magnitudes a sensor is actuated by the physical magnitude to be measured. An optical signal generator and processor provides light signals to the sensor and processes optical output signals transmitted from the sensor. Optical fibers conduct light to the sensor and transmit light signals therefrom to optical detectors. The sensor modulates at least a portion of the light transmitted thereto such that the modulated light output therefrom transmitted to the optic processor contains measuring components representative of the magnitude to be measured and stabilizing component signals independent of the magnitude. The optical processor separates the measuring components and the stabilizing components and generates at least one measuring signal and compensating signals for stabilizing the measuring device.

15 Claims, 19 Drawing Figures

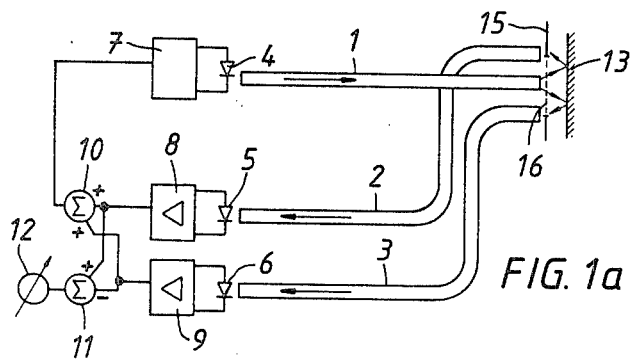
FIG. 1a
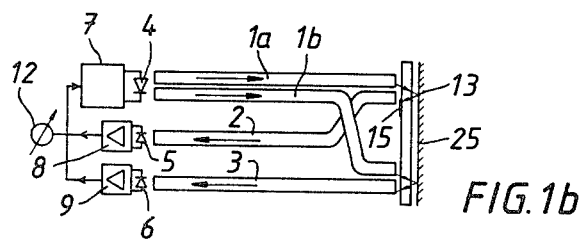
FIG. 1b
FIG. 2a
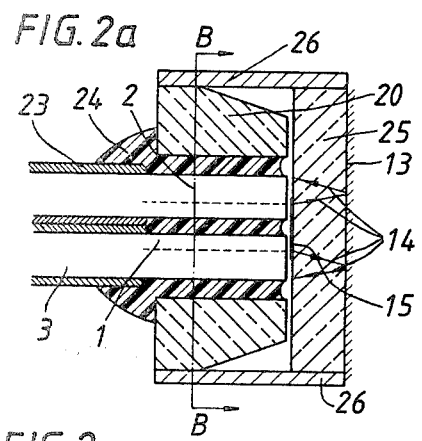
FIG. 2b
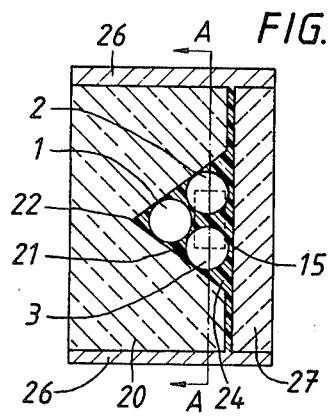
FIG. 2c
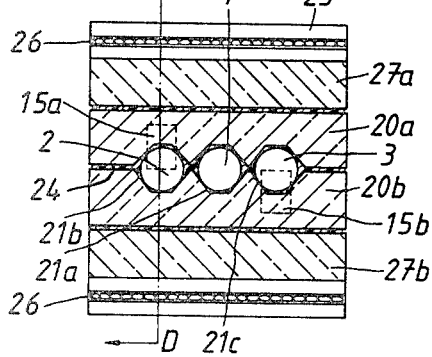
FIG. 2d
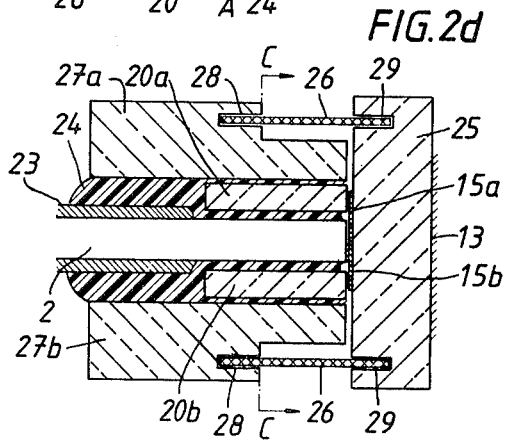

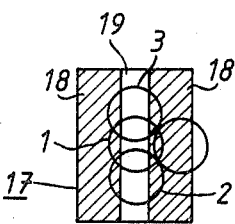
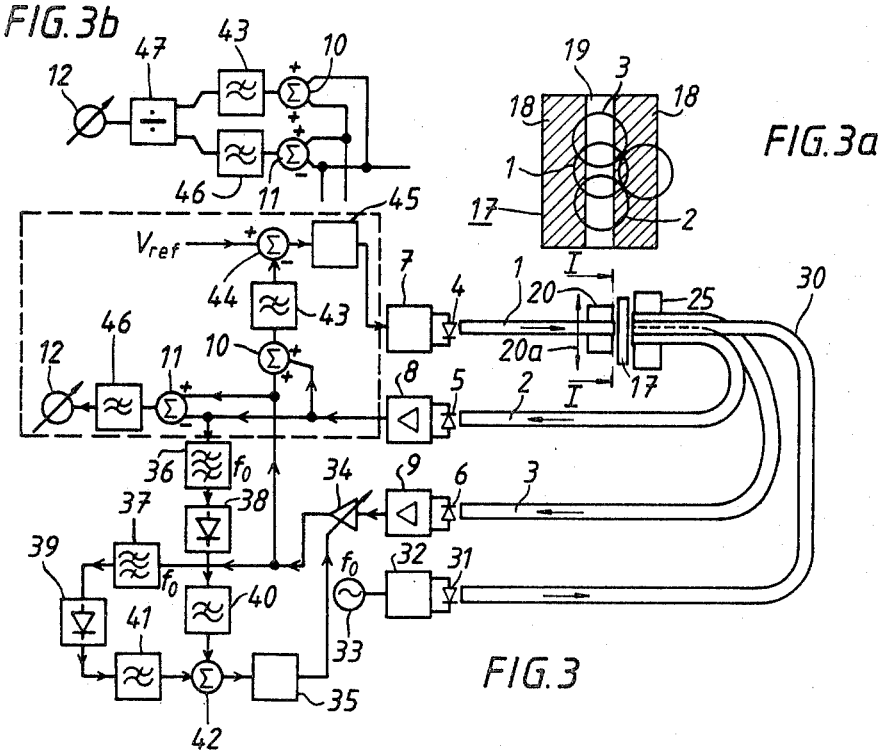
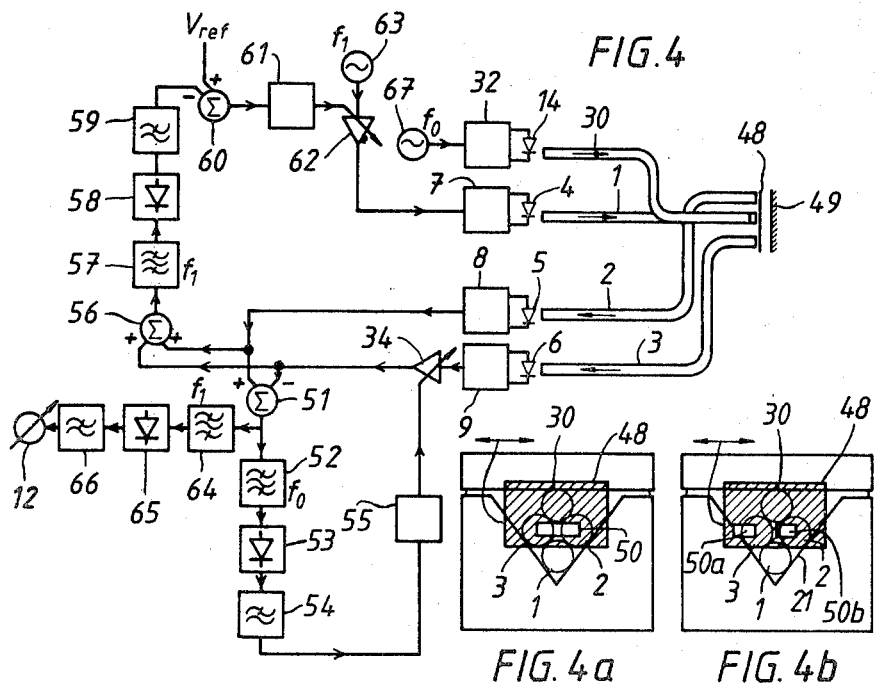

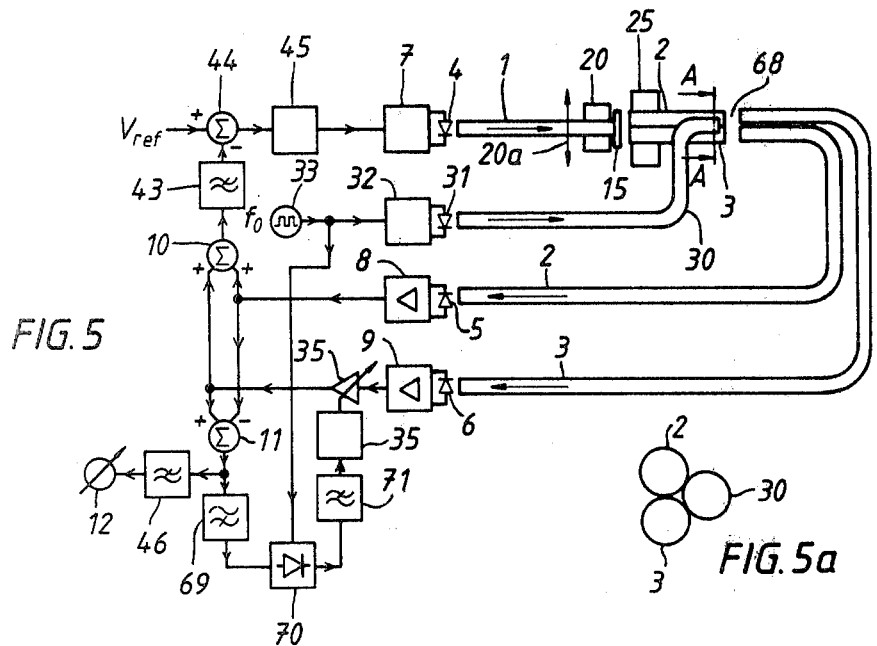
FIG. 5
FIG. 5a
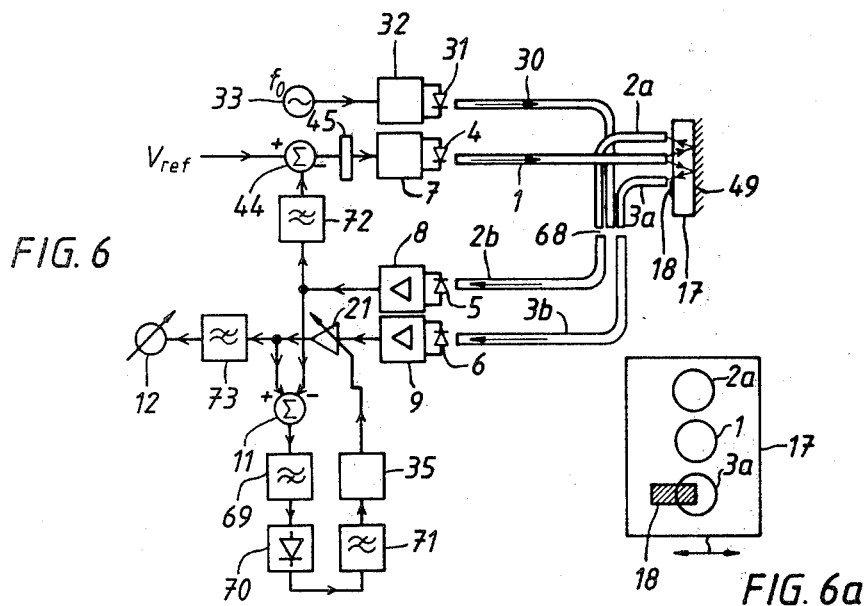
FIG. 6
FIG. 6a

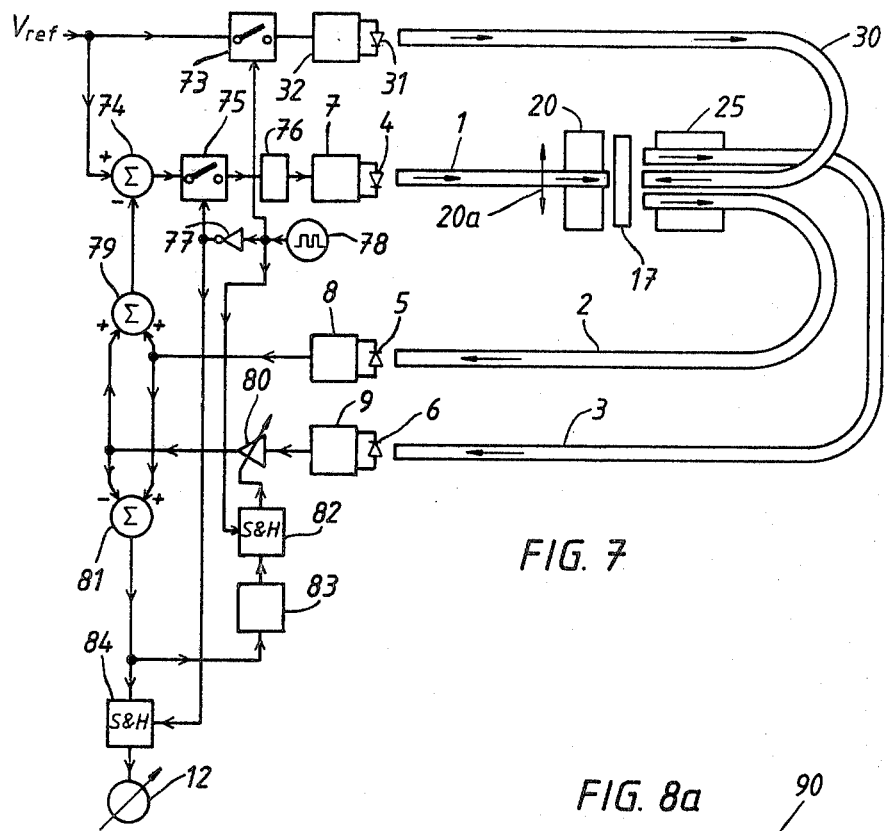
FIG. 7
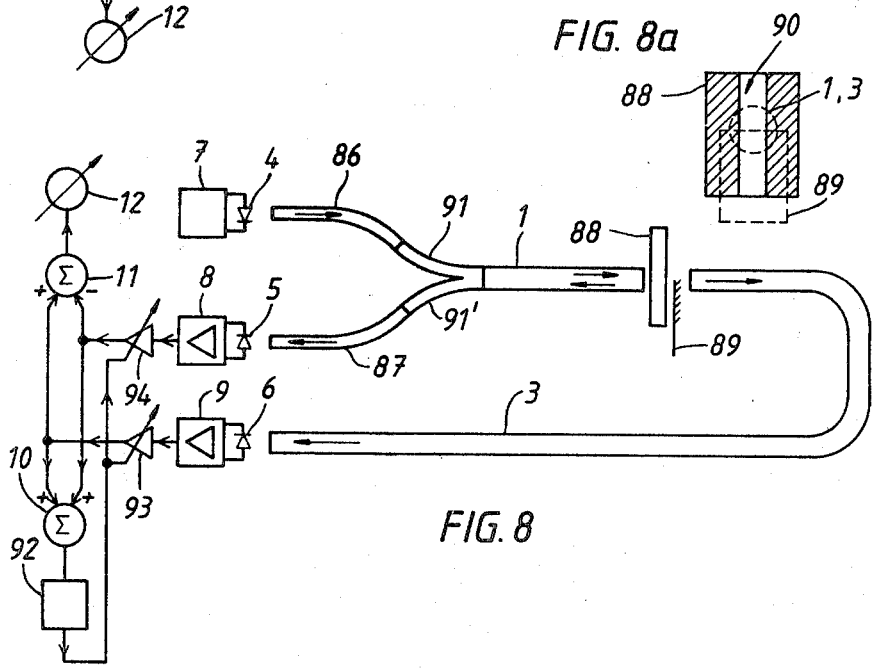
FIG. 8a
FIG. 8

OPTICAL MEASURING DEVICE USING OPTICAL FIBERS

BACKGROUND

1. Field Of The Invention

The present invention relates to optical measuring devices, and more particularly to such devices using optic fibers.

2. Prior Art

In a known optical measuring device for measuring the pressure prevailing in a container, a flexible membrane is inserted into the walls of the container. The membrane has an outside reflecting surface. A light-conducting optic fiber is arranged to illuminate the membrane reflecting surface. A light-emitting fiber is arranged with its input end such that reflected light from the reflecting surface enters the fiber. At the other end of the fiber there is a light detector which senses the strength of the light entering the fiber. The reflecting surface of the membrane and the end surfaces of the fibers are arranged so that the light from the light-conducting fiber reflected into the light-emitting fiber by the reflecting surface depends on the pressure in the container. By analysis of the light from the light-emitting fiber it is therefore possible to measure the pressure in the container.

A measuring device of the above type, however, suffers from a great number of errors, or possibilities of errors, which render the measuring device unsuitable for measurements in which moderate or high demands on the accuracy of measurement are placed. Examples of sources of error are:

Instability of the light source and its drive circuits;

Instability of the light receiver and its amplifier;

Varying damping of the light-conducting fibers because of so-called micro-bending, which means that when the fiber is bent light is conducted out of the fiber and provides an uncontrollable damping of the transmitted light;

Varying damping at fiber joints and instabilities in fiber connections at light transmitters and light receivers; and Instabilities in the fixtures of the fibers.

It is obvious that sources of error such as that mentioned above may cause considerable disturbances in the measurement and great unreliability of the measured values, and should therefore be eliminated or compensated in some way when reliable measuring values are required. The errors are particularly prominent when measuring under varying temperature conditions and when long measuring times are required, without the possibility of calibrating.

SUMMARY OF THE INVENTION

The present invention relates to a measuring device according to the above, but in which the above-mentioned disadvantages will not occur. According to the invention the measuring device is provided with two light-emitting fibers from a sensor included in the measuring device. From the light signals coming through the light-emitting fibers, there is formed a difference signal which is representative of the magnitude to be measured, and a summed signal which is used for stabilizing the measuring device.

The sensor includes means for modulating light energy transmitted to the sensor. The modulating means modulates at least a portion of the light conducted to the sensor such that the transmitted modulated output therefrom contains measuring components representative of the magnitude to be measured and stabilizing component signals independent of the measured magnitude. The measuring components and the stabilizing component signals as determined by optical detectors are separated, and at least one measuring signal and compensating signals for stabilizing the measuring device are generated therefrom.

In modified embodiments of the invention, improved stabilization of the opto-electronics and fiber optics is obtained by using an additional optical fiber for transmitting light to the sensor. The light from the additional fiber provides a means for obtaining matching between the two light-emitting fibers and their associated detectors and electronics.

BRIEF DESCRIPTION OF THE DRAWINGS

Various embodiments of the measuring device are described with reference to the accompanying drawings, wherein:

FIGS. 1a and 1b show schematically the operating principle of the measuring devices;

FIGS. 2a, 2b and 2c, 2d show two different principles of the construction of a sensor used in the measuring devices;

FIGS. 3-6 show modified embodiments of the measuring device according to FIGS. 1a and 1b;

FIG. 7 shows a measuring device with two alternating light sources; and

FIGS. 8 and 8a show a measuring device with fiber optic branching.

DETAILED DESCRIPTION

According to the fundamental principle of the measuring device with a sensor and necessary electrical equipment, shown in FIG. 1a, fiber 1 conducts light to sensor 13 and two fibers 2 and 3 conduct light from sensor 13. Either a fiber bundle or single fibers can be used as fibers 1, 2 or 3. Light-emitting diode (LED) 4 or, alternatively, a semiconductor laser, is arranged to transmit light into light conducting fiber 1. The light intensity transmitted by LED4 is controlled by control device 7. The light flux emanating from light-emitting fibers 2, 3, i.e. the fibers conducting light from the sensor, falls onto two photo-diodes or photo-transistors, photo-conductors or CCD-elements 5 and 6, respectively. The photo-currents generated in photo-sensors 5 and 6 are amplified in two detector amplifiers 8 and 9. The signals received from detector amplifiers 8, 9 are input to each of two summation devices 10 and 11. Summation device 10 has two positive inputs, resulting in a signal occurring on its output corresponding to the sum of the output signals from amplifiers 8 and 9. This signal is supplied as a control signal to an input of control device 7, which controls LED4 so that the summed signal from summation device 10 is maintained constant, which results in good stability properties of the measuring device. Summation device 11 has one positive and one negative input, its output signal thus corresponding to the difference between the output signals from the two amplifiers 8 and 9. The output signal from summation device 11 constitutes the measuring signal and is supplied to instrument 12, which may be adapted to indicate, record or to perform some other suitable function.

The light flux emanating from light-conducting fiber 1 reflects against mirror sensor 13. Movable screen 15 is arranged between the end surfaces of the fibers 1, 2 and 3 and mirror 13. Screen 15 has opening 16, shown by a dashed line in FIG. 1a, which is located in the neutral position of the sensor such that the two light-emitting fibers 2 and 3 receive equally large quantities of the light flux reflected from mirror 13. Thus, the signals generated by amplifiers 8 and 9 are equally great. The measuring signal from summator 11 thus is zero and the control signal from summator 10 equal to twice the output signal from either of amplifiers 8 or 9. Alternative screening arrangements can be used according to FIGS. 2a and 2c.

FIG. 1b shows an alternative construction to that of FIG. 1a. The light generated by LED4 is transmitted through two fibers 1a and 1b. The light transmitted through fiber 1a is reflected by mirror 13, and at least part of the reflected light enters light-emitting fiber 2. Screen 15 is mounted on glass plate 25 and uncovers part of the inlet surface of the fiber 2. The light flux transmitted by fiber 2 is received by photo-diode 5 and associated detector amplifier 8 emits a measuring signal to instrument 12. The light flux in fiber 2 is dependent on the position of screen 15. The light flux from LED4 transmitted through fiber 1b is reflected by mirror 13 and part of the reflected light enters into fiber 3 and is conducted to photo-diode 6. Its associated detector amplifier 9 emits a control signal to control device 7 of LED4, and control device 7 controls the output signal of LED4 so that it is maintained constant. By locating light-emitting fiber 3 above fiber 1a such that mirror 25 reflects light uninfluenced by screen 15, into fiber 3, fiber 1b can be eliminated (cf. FIG. 6).

FIGS. 2a and 2b show two sections, perpendicular to each other, through the sensor body. Thus, FIG. 2a shows a section along the line A—A in FIG. 2b, and FIG. 2b shows a section along the line B—B in FIG. 2a. The sensor comprises a silicon plate 20, on one surface of which triangular cross-sectioned groove 21 is provided, for example, by etching. The three light-conducting fibers 1, 2 and 3 are mounted in groove 21 and embedded therein with epoxy resin 24, and pressed between silicon plate 20 and glass or silicon plate 27. In the example shown, light-conducting fiber 1 is arranged at the bottom of groove 21. The bottom angle of the groove, when it is etched, is 72°, which results in a certain distance between the two light-emitting fibers 2 and 3. Fiber casing 23, which normally surrounds the fibers, has been removed nearest to the free end surfaces of the fibers. Glass plate 25 supports screen 15 on its side facing the end surfaces of fibers 1-3, while at the same time supporting mirror 13 on its opposite side. Glass plate 25 is supported by a pair of springs 26 of metal, silicon, or glass, which are attached by one end to silicon plate 20. Plate 25 is thus able to move together with screen 15 and mirror 13 in front of the end surfaces of the fibers 1-3 in a direction perpendicular to the longitudinal direction of the fibers. The material of springs 26 is selected with regard to the conditions at the place where the sensor is to operate, the presence of electric or magnetic fields, chemically aggressive atmosphere, and the like.

FIG. 2b shows that screen 15 only screens the light-emitting fibers and that the screened surface is changed when plate 25 moves in a lateral direction; the corresponding movement is up-down in FIG. 2b. Because the screen moves within the end surfaces of the fibers transmitting light, a circular area is obtained for the measuring signal as a function of the position of the screen.

FIGS. 2c and 2d show an alternative embodiment of the mechanical construction of the sensor, according to which a better linearity of the sensor is obtained. FIG. 2c shows a section along the line C—C in FIG. 2d, and FIG. 2d shows a section along the line D—D in FIG. 2c. Three parallel grooves 21a, 21b and 21c are etched in each of two silicon plates 20a, 20b which are pressed against each other. Light-conducting fiber 1 is fixed by being pressed between middle groove 21a of silicon plates 20a, 20b and the two light conducting fibers 2 an 3 are fixed by being pressed between outer grooves 21b and 21c of the plates. All the fibers are embedded in epoxy resin 24, which also secures silicon plates 20a, 20b which are surrounded by silicon or glass bodies 27a and 27b. FIG. 2d shows the presence of grooves 28 in the bodies 27a and 27b for attaching springs 26. The other ends of springs 26 are attached in grooves 29 in glass plate 25. Glass plate 25 supports screens 15a, 15b, which are shown by dashed lines in FIG. 2c, and the specular surface 13 shown in FIG. 2d. The direction of movement of glass plate 25 is up-down in both FIGS. 2c and FIG. 2d. Since bodies 27a and 27b are longer than silicon plates 20a and 20b, which is clear from FIG. 2d, space is provided for fiber envelope 23 which is surrounded by epoxy resin 24 in the sensor. Screen 15 of the previously described embodiment is divided into two partial screens 15a and 15b, which are attached to glass plate 25 so as to follow each other. When glass plate 25 moves upwards, the section of the end surface of fiber 2, covered by partial screen 15a is reduced, whereas the section of the end surface of fiber 3, covered by the partial screen 15b, is correspondingly increased. This is due to partial screens 15a, 15b moving in a plane perpendicular to the plane in which fibers 1, 2 and 3 are arranged. When glass plate 25 with partial screens 15a, 15b moves downwards, a change of the fiber end surfaces covered by the partial screens is changed in a corresponding direction.

As stated previously, the measuring device is designed for measuring physical magnitudes. A transducer (not shown) is arranged in all cases to transform, in a known manner, the physical magnitude to be measured into a movement which is transmitted to the part of the sensor that supports screen 15 or an equivalent thereof. The screen is then moved in a direction which corresponds to the state of the physical magnitude. The design of the transducer to effect the conversion of position, power, pressure, acceleration, rate of flow, temperature, etc., into a movement for transferring the screen in the sensor, can be accomplished in many ways. Since the structure and operation of the transducer are irrelevant for an understanding of the measuring device per se, such description is omitted in this specification.

In most cases, it is most suitable to move glass plate 25 parallel to the end surfaces of the fibers, for example as shown by suspending the plate from weak springs or membranes. Alternatively, however, the glass plate 25 can be mounted on one single flat spring with an extension perpendicular to the direction of movement of the plate. The resulting non-linear directional movement can be compensated either electronically or by non-linear screening.

Alternatively, reflecting surface 13 can be arranged on a body which is firmly connected to silicon plate 20. Screen 15 is then placed on a transparent plate between reflecting surface 13 and the end surfaces of the fibers, and is suspended in the same way as glass plate 25 in FIG. 2a.

According to another alternative embodiment, light-conducting fiber 1 can be arranged in such a way that its light-exit surface is turned towards the end surfaces of the light-emitting fibers, that is, the light passes directly from fiber 1 into fibers 2 and 3. Screen 15, which is movable, is then placed between the end surface of the light-conducting fiber and the end surfaces of the light-emitting fibers. This type of sensor has light conductors at two ends, which increases the space requirements when applying the transducer to the measuring object.

According to a further alternative embodiment, the end of the light-conducting fiber can be attached to a first part of the sensor, whereas the ends of the light-emitting fibers are attached to a second part of the sensor. The two parts are movable relative to each other in dependence on the physical magnitude to be measured, and this movement takes place in the plane in which the two light-emitting fibers are located. To provide acceptable linearity for the sensor, upon the relative motion between the parts of the sensor, the increase of incident light in one of the light-emitting fibers must be substantially equal to the reduction of incident light in the other light-emitting fiber. This can be done by arranging a screen between the end surfaces of the fiber leading in light and the end surfaces of the fibers leading out light. The screen is provided with one or more light-transmitting fields, which effect the desired linearity.

FIGS. 3–6 show a further modification of the measuring device shown in FIGS. 1a and 1b. In the device according to FIGS. 3–6, improved stabilization of the opto-electronics and fiber optics is obtained by using an additional fiber transmitting light into the sensor. The light from the additional fiber is then used for securing a match between the two light-emitting fibers with the associated detectors and electronics. Such matching is necessary for stabilization of the light from the first-mentioned light-conducting fiber to be effective under all circumstances.

In FIGS. 3–6 the first light-conducting fiber is designated 1, the second light-conducting fiber is designated 30 and the two light-emitting fibers are designated 2 and 3. Light source 4 with control device 7 is arranged to send light into fiber 1 and the intensity of the light is controlled by control device 7. For Fiber 30 there is a corresponding light source 31 with control device 32. The light flux coming through light-emitting fibers 2 and 3, respectively, is received by photo-detectors 5 and 6, respectively, the photo-currents of which are amplified in detector amplifiers 8 and 9, respectively.

In the measuring device shown in FIG. 3, part of the light from first light-conducting fiber 1 falls through a horizontal, transparent field 19 between two screening portions 18 of plate 17, as shown in FIG. 3a, and which is placed between sensor section 20 which supports the free end of fiber 1 and sensor section 25, which supports fibers 2, 3 and 30. FIG. 3a shows plate 17 in section taken along line I—I of FIG. 3. Sensor section 20 is arranged to move according to arrow 20a in FIG. 3. When sensor section 20 moves upwards relative to sensor section 25, more light is conducted from fiber 1 into fiber 3 and less light from fiber 1 to fiber 2. When sensor section 20 moves downwards, the situation is reversed. Since fibers 2, 3 and 30 are fixed in sensor section 25, the light from fiber 30 is conducted into fibers 2 and 3 by reflections from screening surfaces 18 of plate 17 in such a way that the distribution of the light from fiber 30 to fibers 2 and 3 is independent of the relative motion between sensor sections 20 and 25.

The light in fiber 30, which is generated by light source 31, is modulated in control device 32 by frequency $f_O$, which is obtained from oscillator 33. To compensate for the instabilities which may arise in either of fibers 2 and 3 with associated detectors 5 and 6, respectively, and detector amplifiers 8 and 9, respectively, a controllable amplifier 34, alternatively a multiplicator or an adjustable voltage divider, is connected to the output of amplifier 9 and controlled from control circuit 35 in such a way that the difference between the amplitudes of the AC components with the frequency $f_O$ on the outputs of amplifier 8 and amplifier 34, respectively, is equal to zero. This is accomplished by filtering the two $f_O$ components of the two detector signals by means of band-pass filters 36 and 37, respectively; by rectifying the two $f_O$ components, in rectifiers 38 and 39, respectively, and thereafter by low-pass filtering the two $f_O$ components in low pass filters 40 and 41, respectively. The signals thus processed are supplied to the positive and the negative inputs of a summation device 42, and the difference signal obtained therefrom is supplied to control circuit 35 which controls amplifier 34 so that the two $f_O$ components from amplifier 8 and amplifier 34 have the same amplitude, which ensures correct matching of the two fiber optic and optoelectronics branches from the sensor. To obtain absolute stabilization of the transducer system, the signals from amplifier 8 and amplifier 34 are summed in a summation device 10. The summation signal is low-pass filtered in a low-pass filter 43 and supplied to one input of subtraction device 44, on the other input of which there is supplied a reference signal $V_{ref}$. The output signal of subtraction device 44 is supplied to control circuit 45, which emits a control signal to control device 7 of light source 4 and thus controls the light from the light source in such a way that the filtered summation signal from filter 43 is maintained equal to reference signal $V_{ref}$. The measuring signal is obtained by the formation of the difference between the matched-controlled signals from amplifiers 8 and 34 in a subtraction device 11 and filtering the difference signal in low-pass filter 46. The filtered signal is supplied to measuring instrument 12, which may be of any conventional type.

FIG. 3b shows a different arrangement for obtaining stabilization of the measuring signal input to measuring instrument 12. The output signals from summation devices 10 and 11, respectively, are supplied through filter circuits 43 and 46, respectively, to quotient former 47, the output signal of which is supplied to measuring instrument 12. Signal $V_{ref}$ is then supplied directly to control device 7, and control circuit 45 and subtraction device 44 are omitted.

FIG. 4 shows the sensor arrangement referred to, as applied to a sensor according to FIGS. 2a and 2b. In addition to this Figure showing the application of second light conducting fiber 30 to a sensor type different from that shown in FIG. 3, it also shows electronic equipment suitable for use in the event that the light in the two light-emitting fibers 2 and 3 is amplitude-modulated at two different frequencies $f_0$ and $f_1$.

FIG. 4a shows in more detail the construction of a sensor with second light conducting fiber 30, from which light is reflected from screen 48 and into light-emitting fibers 2 and 3 in such a way that the relation between the light reflected from fiber 30 to fiber 2 and from fiber 30 to fiber 3 is constant and independent of the position of screen 48. Part of the light from light conducting fiber 1 is reflected from mirror 49 behind screen 48 into gap 50, which is provided in the screen, and thereafter into two light-emitting fibers 2 and 3. The difference between the light fluxes occurring in the two light-emitting fibers is therefore a function of the position of the screen in the horizontal direction. The stabilization of the matching is accomplished by forming the difference between the detector signals from amplifiers 8 and 34 in subtraction device 51, whereafter the difference signal passes through band-pass filter 52, is rectified by rectifier 53 and, after having passed low-pass filter 54, is supplied to regulator 55 as an error signal. Regulator 55 controls controllable amplifier 34 such that the difference signal from subtraction device 51, after amplitude demodulation at frequency $f_0$ in circuits 52, 53, 54, is kept equal to zero. The absolute stabilization takes place by summing the signals from amplifiers 8 and 34 in summation device 56, band-pass filtering in filter 57, rectifying in rectifier 58 and low-pass filtering the signals in a filter 59 and supplying them to one input of subtraction device 60, which forms the difference between the processed signal and reference signal $V_{ref}$. The difference signal obtained is used as an error signal input to regulator 61, the output signal of which controls amplifier 62, which controls the amplitude of the output signal from oscillator 63 with frequency $f_1$ such that the summation signal demodulated by frequency $f_1$ in devices 57, 58 and 59 is kept equal to reference signal $V_{ref}$. The measuring signal, finally, is obtained as the difference signal from subtraction device 51, after amplitude demodulation at frequency $f_1$ in circuits 64, 65, and 66 and input to measuring device 12. The signal frequency $f_0$ is generated by oscillator 67 and input to control device 32.

FIG. 4b shows a modified embodiment of the sensor according to FIG. 4a. Because of a somewhat different shape of screen 48 in the sensor, less light enters light-emitting fibers 2 and 3 when the screen moves to the left, whereas more light enters those fibers when the screen moves to the right. This means that total light is a function of the position of the screen, whereas the differenced light is constant and independent of the movement of the screen in the lateral direction. Gap 50 in FIG. 4a then corresponds to gap openings 50a and 50b in FIG. 4b. In the electronic equipment the change of the gap implies that subtracting device 51 should be a summator and summating device 56 should be replaced by a subtracting device. Otherwise, the electronics system remains unaltered.

FIG. 5 shows a modified embodiment wherein instead of switching in light from second light conducting fiber 30 into light-emitting fibers 2 and 3 in the sensor itself, such a function can be done outside the sensor somewhere between the sensor and the light detectors. In that case, however, no adjustment of the signal matching is obtained for that part of the light-emitting fiber pair which is located between the sensor and the location where the light is switched in. The elements included in the sensor that have been described with reference to FIG. 3 are therefore not repeated in the following description. To conduct light from second light conducting fiber 30 into the light-emitting fibers, a fiber joint 68 is provided, and FIG. 5b shows a section along line A—A in FIG. 5 showing the configuration of the three fibers. In this case the electronics system differs from that shown in FIG. 3 in that a square wave is used instead of a sinusoidal wave for modulation of light source 31. This means that the demodulation of the difference signal from subtraction device 11 is performed by filtering in filter 69 which is connected to the output of subtraction device 11, by phase-sensitive rectification in rectifier 70 and low-pass filtering in filter 71 for the formation of the error signal to regulator 35. In other respects, the electronic system is the same as shown in FIG. 3.

The embodiment described so far shows that two light-emitting fibers are used for transmitting information about the measured value. FIG. 6 shows an arrangement in which only one light-emitting fiber $3a+3b$ is used for transmitting the measuring signal from the sensor to the measuring electronic system. The sensor itself includes glass plate 17 which, when moving in the directions of the double arrow in FIG. 6a by means of screen 18 mounted on plate 17, screens a major or minor quantity of the light which, from light conducting fiber 1, after reflection from reflecting surface 49, reaches the end of light-emitting fiber 3a. Since no screen is present in front of light-emitting fiber 2a, the light which is reflected into that fiber is not influenced by the movements of glass plate 17 (cf. FIG. 1b). FIG. 6a shows glass plate 17 with screen 18 in a view perpendicular to the fiber end surfaces. From light-emitting diode 4 a continuous light is emitted to the sensor through fiber 1. The part of this light which is reflected by mirror 49 into light-emitting fiber 2a, is conducted via low-pass filter 72 to one input of subtracting device 44 in which it is compared with reference signal $V_{ref}$. From subtracting device 44 an error signal is obtained, which is supplied to control device 7 of light-emitting diode 4 via control circuit 45. Control device 7 controls light-emitting diode 4 so that the output signal from filter 72 is maintained equal to $V_{ref}$. The light which, after passing screen 18, enters fiber 3a is transmitted through fiber 3b to photo-diode 6, the photocurrent of which is amplified in amplifiers 9 and 21 and, after low-pass filtering in filter 73, is used as a measuring signal and supplied to measuring instrument 12. Similarly as shown and described with reference to FIG. 5, the light emitted by light source 31 and transmitted through fiber 30 is used to regulate amplifier 21 via fibers 2b and 3b, such that the difference between the output signals from amplifiers 8 and 21 is maintained equal to zero with regard to the light through fiber 30.

FIG. 7 shows an arrangement by which, instead of using various modulation frequencies in light sources 4 and 31, these light sources are switched in during different time intervals to make it possible to determine by detectors 5 and 6 from which of the light conducting fibers 1 and 30 the light occurring in the light-emitting fibers emanates. The sensor and fiber arrangement as such corresponds to that shown in FIG. 3 and is therefore not described here. To be able to alternately switch in light sources 4 and 31 while at the same time processing the signals from detectors 5 and 6 in the proper manner, a somewhat different design of the electronic system is required as compared to that shown in FIG. 3. Oscillator 78 controls an analogous switch 73 which, for a specified time of the period of oscillator 78, connects reference voltage $V_{ref}$ to drive circuit 32 for light source 31, and therefore sends light into fiber 30. During the same time interval a second analogous switch 75 is held open by inverter 77, light source 4 thus being extinguished. Oscillator 78 also controls sampling and holding circuit 82, so that it operates in the sampling mode, whereby the output signal from regulator 83 controls controllable amplifier 80 such that the output signal therefrom is kept equal to the output signal of detector amplifier 8. The output signals from amplifiers 80 and 8 are compared in summation device 81, the output of which is connected to the input of regulator 83. The electronic equipment thus performs stabilization of the matching for that part of the period of oscillator 78 during which light source 31 is switched in. For the remaining parts of the period of oscillator 78, switch 73 is switched off, light source 31 thus being extinguished and regulator circuit 83 being in a holding mode, whereby the adjusted matching-stabilizing amplification is kept adjusted in amplifier 80. For this part of the period of the oscillator, adjustment of the light intensity of light source 4 takes place so that the summation signal from summator 79 acquires the same value as reference signal $V_{ref}$. This can be performed by switch 75 connecting the output of summator 74 to the input of regulator 76, thus making possible the previously described adjustment of light source 4. When this adjustment is completed, sampling and holding circuit 84 reads the output signal from summating device 81, connected as a difference circuit, and maintains this value until the next reading. These readings are made with the frequency generated by oscillator 78, and the measuring value is indicated by instrument 12.

According to FIG. 1a, three fibers are used between the electronic system and the sensor. However, this number can be reduced to two fibers if a fiber optical branching is used according to FIG. 8. The light transmitted from light source 4 is conducted by fiber 86 to branch 91 and further through fiber 1 to the sensor, which comprises fixed screen 88 with transparent gap 90, as shown in FIG. 8 a, and which releases part of the light from fiber 1 to movable mirror 89. Mirror 89 reflects a portion of the light back towards fiber 1, and part of the reflected light is conducted through branch 91 and fiber 87 to photo-detector 5. Part of the light, which in the sensor passes above mirror 89, is transmitted by light-emitting fiber 3 to photo-detector 6. This means that the light to detector 5 increases and the light to detector 6 decreases when mirror 89 moves upwards and vice-versa when the mirror moves downwards. When selecting a suitable screen 80 and appropriate amplifications in detector amplifiers 8 and 9, the same conditions are obtained as for the measuring device according to FIG. 1a, thus making it possible to use the same electronic system. However, FIG. 8 shows a modification of the electronic system, in which the output signal from summator 10 is used to control, via regulator 92, two matched, controllable amplifiers 93, 94 instead of light source 4, which in this case is driven with constant current.

What is claimed is:

1. Optical measuring device for measuring physical magnitudes, comprising:
   a sensor actuated by the physical magnitude to be measured;
   means for generating optic input signals to said sensor;
   means for processing optic output signals emanating from said sensor and including at least two optical detection means;
   at least one optical input fiber for transmitting said optic input signals to said sensor and at least two optical output fibers for transmitting said optic output signals to said at least two optical detection means;
   said sensor including means for modulating at least a portion of the light conducted thereto such that said optic output signals contain at least one measuring component representative of the magnitude to be measured and at least one stabilizing component with a smaller dependence on said physical magnitude than said measuring component; and
   said means for processing further including means for separating said at least one measuring component and said at least one stabilizing component, and means for generating therefrom at least one measuring signal and at least one compensating signal, and means responsive to said at least one compensating signal for reducing the dependence of said measuring signal on instabilities in the the measuring device.

2. Optical measuring device according to claim 1 wherein said at least one measuring component is transmitted from said sensor to said means for processing by only one of said at least two optical output fibers, and said at least one stabilizing component is transmitted from said sensor to said means for processing by another of said at least two optical output fibers.

3. Optical measuring device according to claim 1 wherein each of said at least two optical output fibers transmits at least one of said measuring and one of said stabilizing components, and wherein said means for processing further includes subtraction means for forming said at least one measuring signal from the difference between the optic output signals transmitted by said at least two optical output fibers, and summation means for generating said at least one compensating signal from the sum of the optic output signals transmitted by said at least two optical fibers.

4. Optical measuring device according to claim 1 wherein each of said at least two optical output fibers transmits at least one of said measuring and one of said stabilizing components, said means for processing further includes summation means for forming said at least one measuring signal from the sum of the optic output signals transmitted by said at least two optical output fibers, and subtraction means for generating said at least one compensating signal from the difference between the optic output signals transmitted by said at least two optical output fibers.

5. Optical measuring device as in claim 1 wherein each of said at least two optical output fibers transmits at least one of said stabilizing components, said means for processing further includes subtraction means for forming at least one compensating signal from the difference between said stabilizing components from said at least two optical output fibers, and further comprising means responsive to said at least one compensating signal for controlling signal instabilities in said at least two optical output fibers, said means for generating, and said means for processing.

6. Optical measuring device as in claim 1 wherein said means for generating optic input signals generates two optic input signals and includes means for modulating said two optic input signals with different frequencies, there being one optical input fiber for transmitting each modulated optic input signal to said sensor, and said means for processing further includes separate filtering circuits for dividing the optic output signals from said at least two optical output fibers into at least two optical components, each originating respectively in each one of said two optic input signals, and means for forming said at least one measuring signal and said at least one compensating signal from said at least two optical components.

7. Optical measuring device as in claim 1 wherein said means for generating optic input signals generates two optic input signals during different time intervals, and said means for processing further includes sampling circuits for dividing the optic output signals from said at least two optic output fibers into at least two optical components, each originating respectively in each one of said two optic input signals, and means for forming said at least one measuring signal and said at least one compensating signal from said at least two optical components.

8. Optical measuring device as in claim 1, further comprising means for compensating for instabilities in said at least one optical input fiber, said at least two optical output fibers, said means for generating optic input signals and said means for processing by regulating said means for generating optic input signals to maintain said at least one compensating signal constant.

9. Optical measuring device as in claim 1 further comprising means for compensating for instabilities in said at least one optical input fiber, said at least two optical output fibers, and in said at least two optical detection means by regulating said at least two optical detection means to maintain said at least one compensating signal constant.

10. Optical measuring device as in claim 1 wherein said means for processing includes subtraction means for forming a compensating signal from the difference between the optic output signals transmitted from said at least two optical output fibers, with respect to stabilizing components originating in said means for generating optic input signals, and including means for controlling the sensitivity of said at least two detection means such that said compensating signal is substantially kept equal to zero.

11. Optical measuring device as in claim 1 wherein said means for generating optic input signals generates two optic input signals and there being an optical input fiber for transmitting each of said optic input signals, and said means for modulating including a screening plate having a transparent field therein for passing light from one of said two optic input fibers to said at least two optic output fibers on the opposite side of said screening plate, whereby movement of said one optic input fiber relative to said at least two optic output fibers generates measuring and stabilizing components therein, and said means for modulating further including means for transmitting light to said at least two optic output fibers with a constant relationship and independent of said movement, thereby generating stabilizing component signals for stabilization of said at least two optic output fibers and said at least two optical detection means.

12. Optical measuring device as in claim 1 wherein said means for generating optic input signals generates two optic input signals and there being an optical input fiber for transmitting each of said optic input signals, and said means for modulating including a screen having at least one gap therein extending between the two optic input and said at least two optic output fibers, and a mirror positioned behind said screen, whereby light reflected from one of said optical input fibers to said at least two optical output fibers is modulated to generate measuring and stabilizing components when said screen and/or mirror is moved relative to the two optical input and said at least two optical output fibers, and said sensor including a light path for transmission of the light from the other of the two optical input fibers to said at least two optical output fibers, which is not affected by movement of said screen and/or mirror.

13. Optical measuring device as in claim 1 including two optical input fibers, one of which conducts light to said sensor, two optical output fibers for transmitting light from said sensor to said at least two optical detection means, the other of said optical input fibers positioned close to said two optical output fibers to direct light substantially equally therein to generate stabilizing component signals.

14. Optical measuring device as in claim 1 including two optical input fibers for conducting light to said sensor, and said means for modulating including a mirror mounted to said sensor, and two optical output fibers for transmitting light reflected from said mirror to said optical detection means, one of said optical input fibers directing light onto said mirror to be reflected into each of said two optical output fibers, and the other of said optical input fibers being positioned to direct light equally into each of said two optical output fibers, one of said optical output fibers transmitting said at least one measuring component and the other of said optical output fibers transmitting said at least one stabilizing component.

15. Optical measuring device as in claim 1 further comprising a branched optical fiber having one branch for conducting light to said sensor, and another branch for transmitting light reflected from said sensor to one of said at least two optical output fibers, and another of said at least two optical output fibers mounted to receive light from said at least one optical input fiber.

* * * * *